US012331865B1

(12) United States Patent
Hsu

(10) Patent No.: US 12,331,865 B1
(45) Date of Patent: Jun. 17, 2025

(54) PUSH TYPE LOCKING STRUCTURE FOR PIPE COUPLERS

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/773,600

(22) Filed: Jul. 16, 2024

(30) Foreign Application Priority Data

Jun. 27, 2024 (TW) ................................. 113124053

(51) Int. Cl.
*F16L 37/084* (2006.01)
*F16L 37/086* (2006.01)
*F16L 37/098* (2006.01)
*F16L 37/54* (2006.01)

(52) U.S. Cl.
CPC ......... *F16L 37/0841* (2013.01); *F16L 37/086* (2013.01); *F16L 37/098* (2013.01); *F16L 37/54* (2013.01)

(58) Field of Classification Search
CPC ... F16L 37/084; F16L 37/0841; F16L 37/086; F16L 37/0848; F16L 37/54; F16L 37/098
USPC .......................................................... 285/317
See application file for complete search history.

(56) References Cited

U.S. PATENT DOCUMENTS

| 793,103 | A | * | 6/1905 | Scholtz | F16L 27/073 |
| | | | | | 285/317 |
| 928,055 | A | * | 7/1909 | Johnson et al. | F16L 27/0812 |
| | | | | | 285/317 |
| 3,167,335 | A | * | 1/1965 | Maisch | F16L 37/0844 |
| | | | | | 285/317 |
| 2007/0152443 | A1 | * | 7/2007 | Cheng | F16L 37/0847 |
| | | | | | 285/317 |

FOREIGN PATENT DOCUMENTS

| TW | 201947148 A | 12/2019 |
| TW | 202107000 A | 2/2021 |
| TW | 202126942 A | 7/2021 |

OTHER PUBLICATIONS

Search Report dated Nov. 28, 2024 issued by Taiwan Intellectual Property Office for counterpart application No. 113124053.

* cited by examiner

*Primary Examiner* — David Bochna
(74) *Attorney, Agent, or Firm* — Demian K. Jackson; Jackson IPG PLLC

(57) ABSTRACT

A push type locking structure for pipe couplers includes a coupling pipe externally provided with a recess having a pair of pipe pivotal holes formed on two side walls thereof and having a radially penetrated receiving hole formed at a first end thereof to communicate with a passage defined in the coupling pipe; a push member including a pair of first pivotal connection sections and a second pivotal connection section; a hollow push retaining member received in the receiving hole on the coupling pipe; and a spring disposed between the recess and the push member. The push member (Continued)

is pivotally connected to the push retaining member and the coupling pipe by two shafts extending through the first and the second pivotal connection section. When the push member is pushed downward, the push retaining member is moved upward radially to unlock a pipe from the coupling pipe to move axially.

9 Claims, 6 Drawing Sheets

PUSH TYPE LOCKING STRUCTURE FOR PIPE COUPLERS

This application claims the priority benefit of Taiwan patent application number 113124053 filed on Jun. 27, 2024, the disclosure of which is hereby incorporated by reference in its entirety.

FIELD OF THE INVENTION

The present invention relates to a push type locking structure, and more particularly, to a push type locking structure for pipe couplers that enables two pipes to be quickly connected and disconnected smoothly.

BACKGROUND OF THE INVENTION

In the present gas transportation system or water cooling system, pipes and couplers are often used to connect different unit modules to each other, and gas or liquid is flowing in the pipes. The water cooling system usually provides a better heat dissipation effect to effectively increase the maximum operating power of electronic elements and accordingly, has been widely applied to the heat dissipation of high performance electronic elements. To satisfy a variety of requirements for pipe arrangement in the system, the water cooling system includes a plurality of fluid pipes. These fluid pipes are necessarily disconnected and re-connected now and then for the purpose of maintenance and repair during the use thereof.

Please refer to FIGS. 1 and 2. A fluid connector and fluid connection module using the same are disclosed. The fluid connection module includes a male coupler 10 and a female coupler 20. The male coupler 10 has a male coupler shell 11 and a stepped stop section 15 externally formed on the male coupler shell 11. The female coupler 20 has a female coupler shell 21 and a mounting hole 211 extending radially through the female coupler shell 21. A locking member 25 is fitted in the mounting hole 211 and is guided by the mounting hole 211 to move therein. An elastic element 26 has two ends elastically pressed against the locking member 25 and the female coupler shell 21. The locking member 25 includes a locking passage 256, via which an end of the male coupler 10 is extended. A conical surface 253 is formed at a lower side of the locking passage 256 corresponding to the stepped stop section 15. When an end of the male coupler 10 is extended through an interior chamber of the female coupler shell 21 into the locking passage 256 of the locking member 25, the stepped stop section 15 on the male coupler shell 11 and the conical surface 253 on the locking member 25 would eventually abut on each other to lock the male coupler 10 and the female coupler 20 to each other, and the male coupler 10 is prevented from separating axially from the female coupler 20. To unlock the male coupler 10 from the female coupler 20, the locking member 25 is pushed to move downward in the mounting hole 211, until the conical surface 253 on the locking member 25 is moved away from the stepped stop section 15. At this point, the stepped stop section 15 can be moved outward to pass over the conical surface 253, and the male coupler 10 can be moved axially relative to the female coupler 20 to unlock from the female coupler 20.

The above prior art locking structure has the following problems. That is, the locking member 25 is an integrally formed inverted-L shaped member including a vertical inserting section 251 for inserting into the mounting hole 211 and a horizontal operating section 252 integrally connected to an end of the vertical inserting section 251 for pushing downward. Since the elastic element 26 is disposed between the operating section 252 and the female coupler shell 21, the operating section 252 of the locking member 25 subjected to an externally applied downward push force or an upward elastic restoring force from the elastic element 26 would bring the whole inverted-L shaped locking member 25 to move downward or upward in the mounting hole 211.

In other words, the external force or the elastic restoring force is applied to the horizontal operating section 252 of the locking member 25 while the horizontal operating section 252 is located at one end of the vertical inserting section 251, such that the force applied to the operating section 252 is not a normal force relative to the inserting section 251. When the downward force is applied to a free end of the horizontal operating section 252, the vertical inserting section 251 moves synchronously downward in the mounting hole 211 but tends to bias in the radial direction. Therefore, an upper inner wall surface 251a and a lower outer wall surface 251b of the vertical operating section 251, as indicated by the circled areas in FIG. 1, are in frictional contact with some specific position or contact surface on an inner wall of the mounting hole 211 to cause wear thereat. On the other hand, when the horizontal operating section 252 is not subjected to any downward force and an elastic restoring force of the elastic element 26 pushes the free end of the operating section 251 upward, the vertical inserting section 251 is brought by the horizontal operating section 252 to move upward synchronously in a radially biased condition. As a result, an upper outer wall surface 251c and a lower inner wall surface 251d of the operating section 251, as indicated by the circled areas in FIG. 1, are in frictional contact with some specific position or contact surface on the inner wall of the mounting hole 211 to cause wear thereat. Further, the above mentioned frictional contact would cause serious interference between the inserting section 251 and the mounting hole 211 to form a resistance when the inserting section 251 moves relative to the mounting hole 211. The resistance would inevitably hinder the inverted-L shaped locking member 25 from moving smoothly in the mounting hole 211. In the case the vertical inserting section 251 is biased frequently, it might be bent or broken due to wearing over a long time. Or, in the case the locking member 25 is improperly operated to lock or unlock the male and the female coupler 10, 20 to or from each other, the female coupler shell 21 and the locking member 25 also tend to become damaged owing to excessive wear between them. It is therefore desirable to overcome the above disadvantages of the prior art locking member.

SUMMARY OF THE INVENTION

To effectively solve the above problems, a primary object of the present invention is to provide a push type locking structure for pipe couplers, which can be operated smoothly without causing frictional contact between and excessive wear of a locking member and the pipes connected via the locking member.

To achieve the above and other objects, the push type locking structure for pipe couplers according to the present invention includes a coupling pipe, a push member, a push retaining member, and a spring.

The coupling pipe has a first and a second end and internally defines a passage. Further, the coupling pipe is externally formed between the first and the second end with a recess having a pair of pipe pivotal holes, and has a receiving hole provided at a position closer to the first end to extend radially through the outer wall of the coupling pipe and communicate with the passage. The push member is provided on a bottom side with a pair of first pivotal connection sections respectively having a first pivotal hole, and a second pivotal connection section having a second pivotal hole. The push retaining member defines an opening, and has a retaining pivotal hole provided at a top portion thereof. A first shaft is extended through the first pivotal holes and the retaining pivotal hole, and a second shaft is extended through the second pivotal hole and the pair of pipe pivotal holes, such that the push member is pivotally connected to the push retaining member and the coupling pipe by the first and the second shaft, respectively. The spring is located between the push member and the recess with two ends thereof elastically pressed against the bottom side of the push member and the bottom of the recess.

When the push member is pushed downward, the push retaining member is lifted radially, and a pipe inserted into the first end of the coupling pipe is unlocked from the locking structure and can be moved axially relative to the coupling pipe to quickly disconnect from another pipe connected to the second end of the coupling pipe.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

Figure 1:
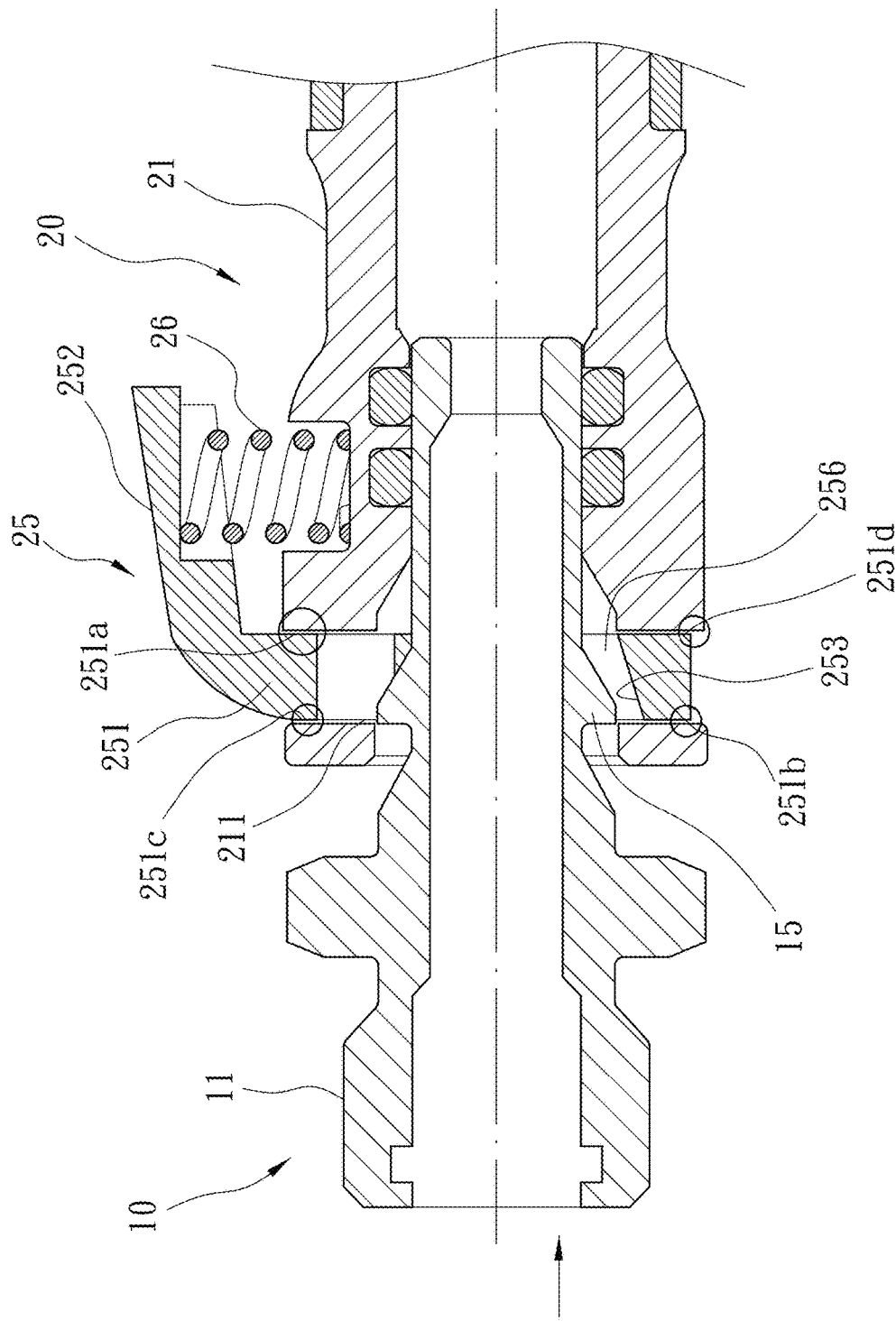
FIG. 1 is an assembled sectional side view of a prior art fluid connector and fluid connection module using the same.
Figure 2:
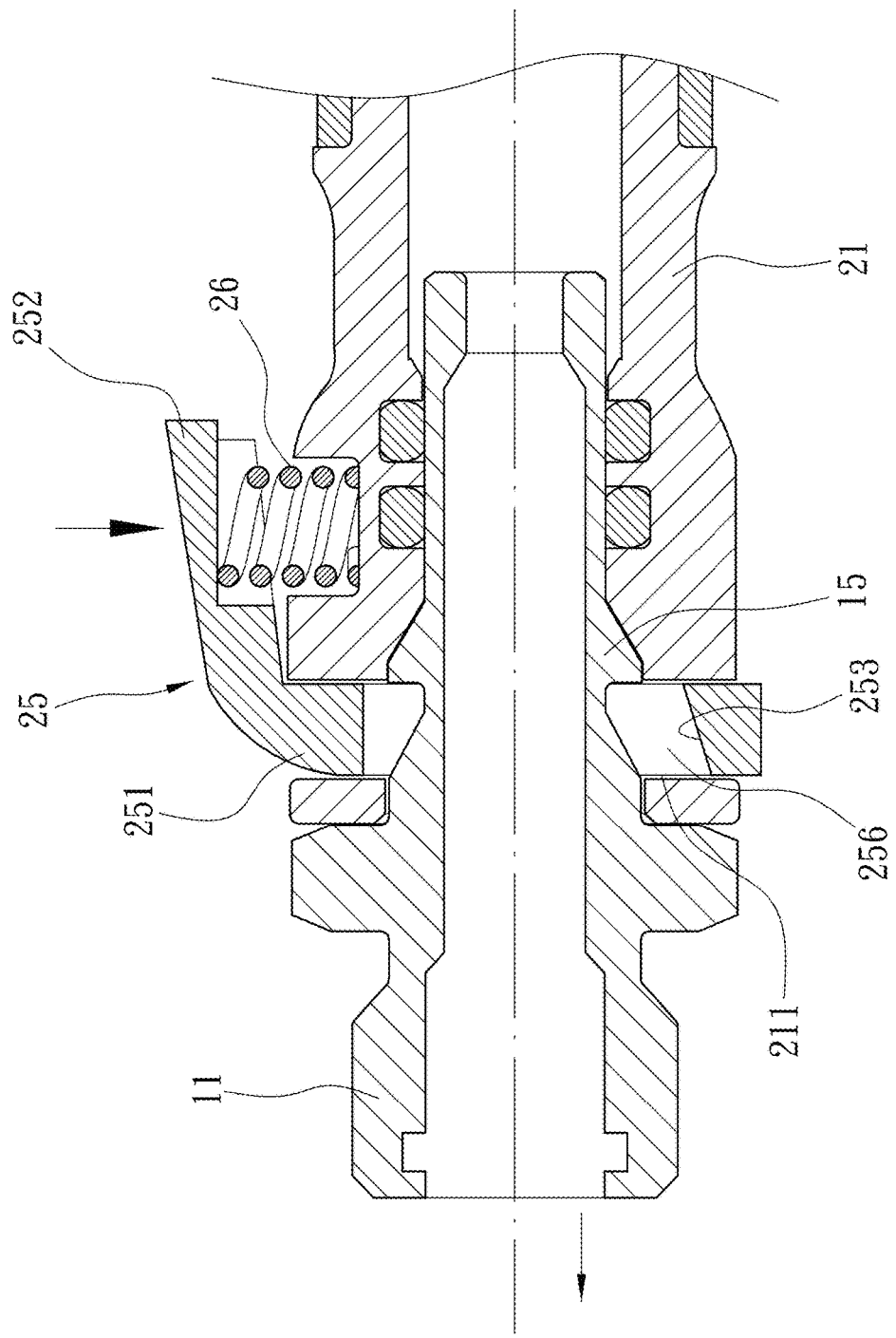
FIG. 2 shows the fluid connection module of FIG. 1 in a downward pushed and locked state.

The present invention will now be described with a preferred embodiment thereof. It is understood the accompanying drawings are only illustrative and not intended to limit the present invention.

Please refer to FIGS. 3 to 6, in which a push type locking structure for pipe couplers according to the present invention is shown. For the purpose of conciseness and clarity, the present invention is also briefly referred to as the locking structure and generally denoted by reference numeral 100 herein. As shown, the locking structure 100 is used to quick connect or disconnect a first and a second pipe 70, 80 to or from each other. The locking structure 100 employs a pivotal connection mechanism as a fulcrum. When an external downward push force or an upward elastic restoring force of a spring is applied to the locking structure 100, a series of motions of the locking structure 100 occurs smoothly for the second pipe to move or not to move axially relative to the first pipe, so that the first and the second pipes can be connected to or disconnected from each other while ensuring upgraded reliance of the pipe connection.

Figure 3:
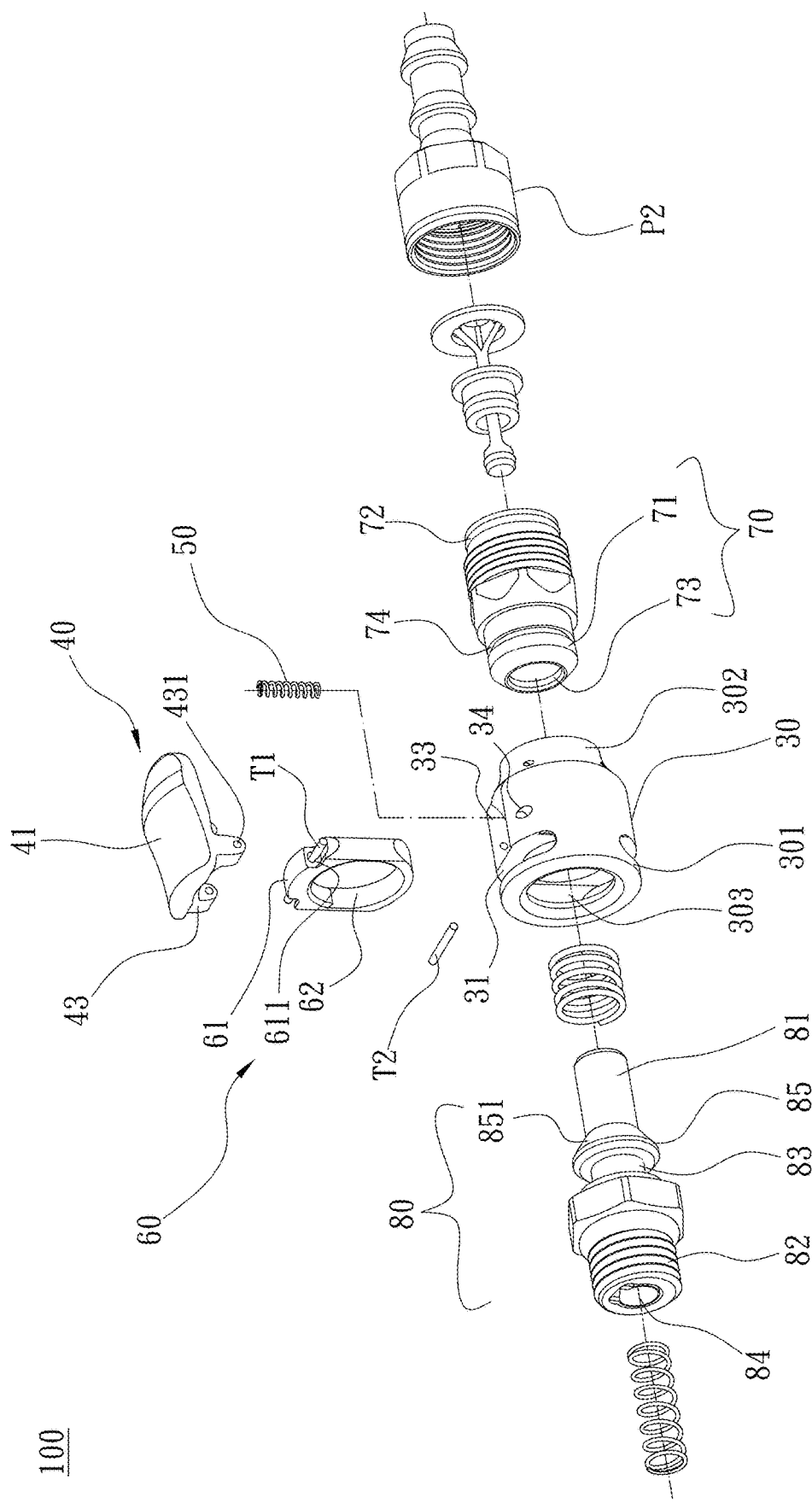
FIG. 3 is an exploded perspective view of a push type locking structure for pipe couplers according to an embodiment of the present invention.
Figure 4:
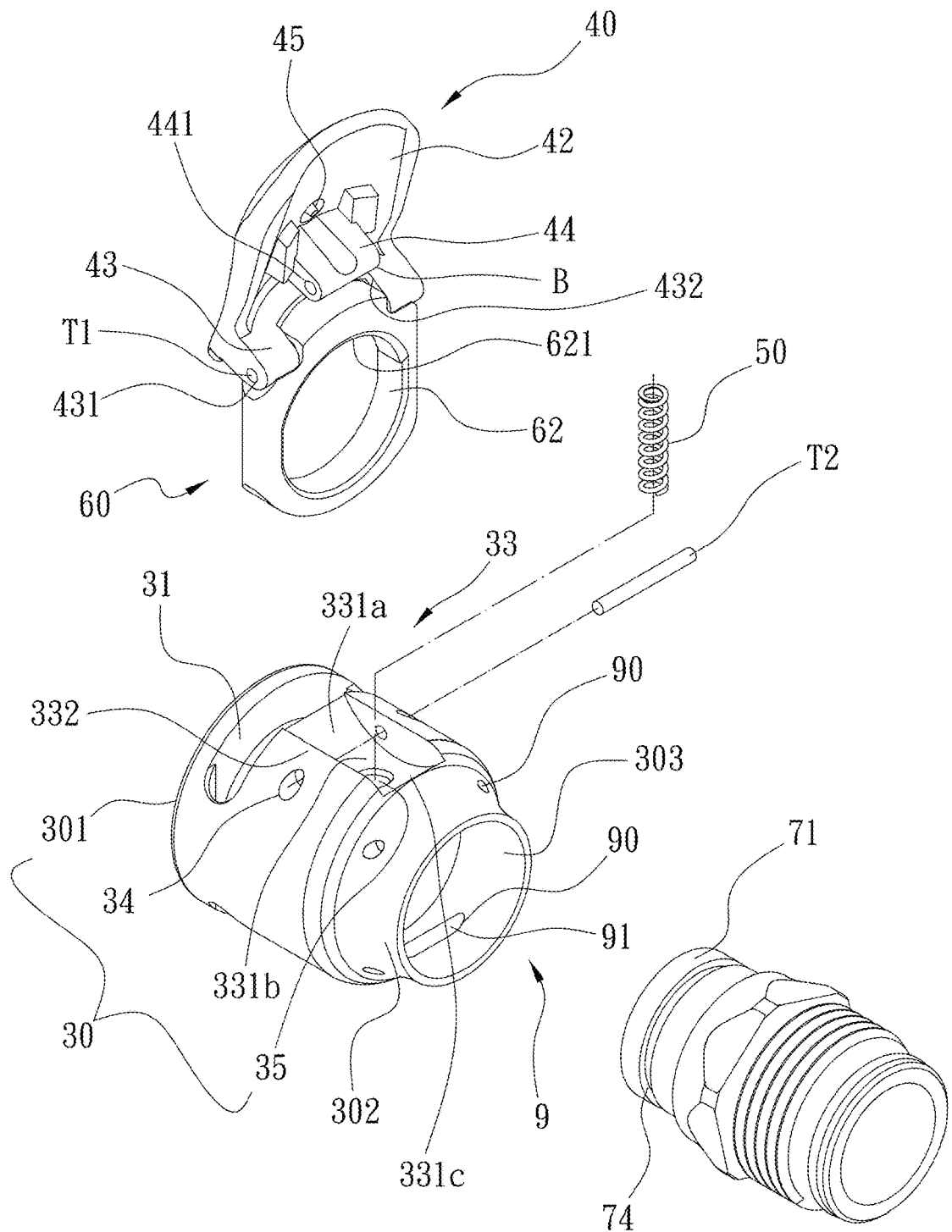
FIG. 4 shows a part of the locking structure of FIG. 3.

As shown in FIGS. 3 and 4, the push type locking structure 100 includes a coupling pipe 30, a push member 40, a spring 50, a push retaining member 60, and at least two shafts T1, T2.

The coupling pipe 30 has a first end 301 and a second end 302, which are axially spaced from each other, and a receiving hole 31 and a recess 33 formed on a circumferential wall of the coupling pipe 30 between the first and the second end 301, 302. The coupling pipe 30 internally defines a passage 303, which extends axially from the first to the second end 301, 302. The second pipe 80 has a coupling section 81 slidably extending through the first end 301 into the passage 303; and the first pipe 70 has an engaging section 71 fitted in the second end 302. The receiving hole 31 extends radially through diametrically opposite top and bottom portions of the circumferential wall of the coupling pipe 30 and is located in the vicinity of the first end 301 to communicate with the passage 303. The recess 33 is depressed from an outer surface of the circumferential wall of the coupling pipe 30 and is located between the receiving hole 31 and the second end 302. A pair of pipe pivotal holes 34 is formed on the recess 33 to perpendicularly extend through two axially side walls 332 of the recess 33. The recess 33 is provided at a curved bottom A with a blind hole 35, which is located near the pipe pivotal holes 34.

The recess 33 consists of a front section 331a, a middle section 331b, and a rear section 331c sequentially arranged in an axial direction of the coupling pipe 30 from the first end 301 toward the second end 302, as shown in FIG. 4. In the illustrated embodiment, the middle section 331b has a recess depth larger than those of the front section 331a and the rear section 331c; and the middle section 331b has a bottom connected to those of the front and the rear section 331a, 331c, such that the curved bottom A of the recess 33 is a concave bottom. And, the front section 331a and the rear section 331c have an opening facing toward the second pipe 80 and the first pipe 70, respectively, as shown in FIGS. 5 and 6.

Figure 5:
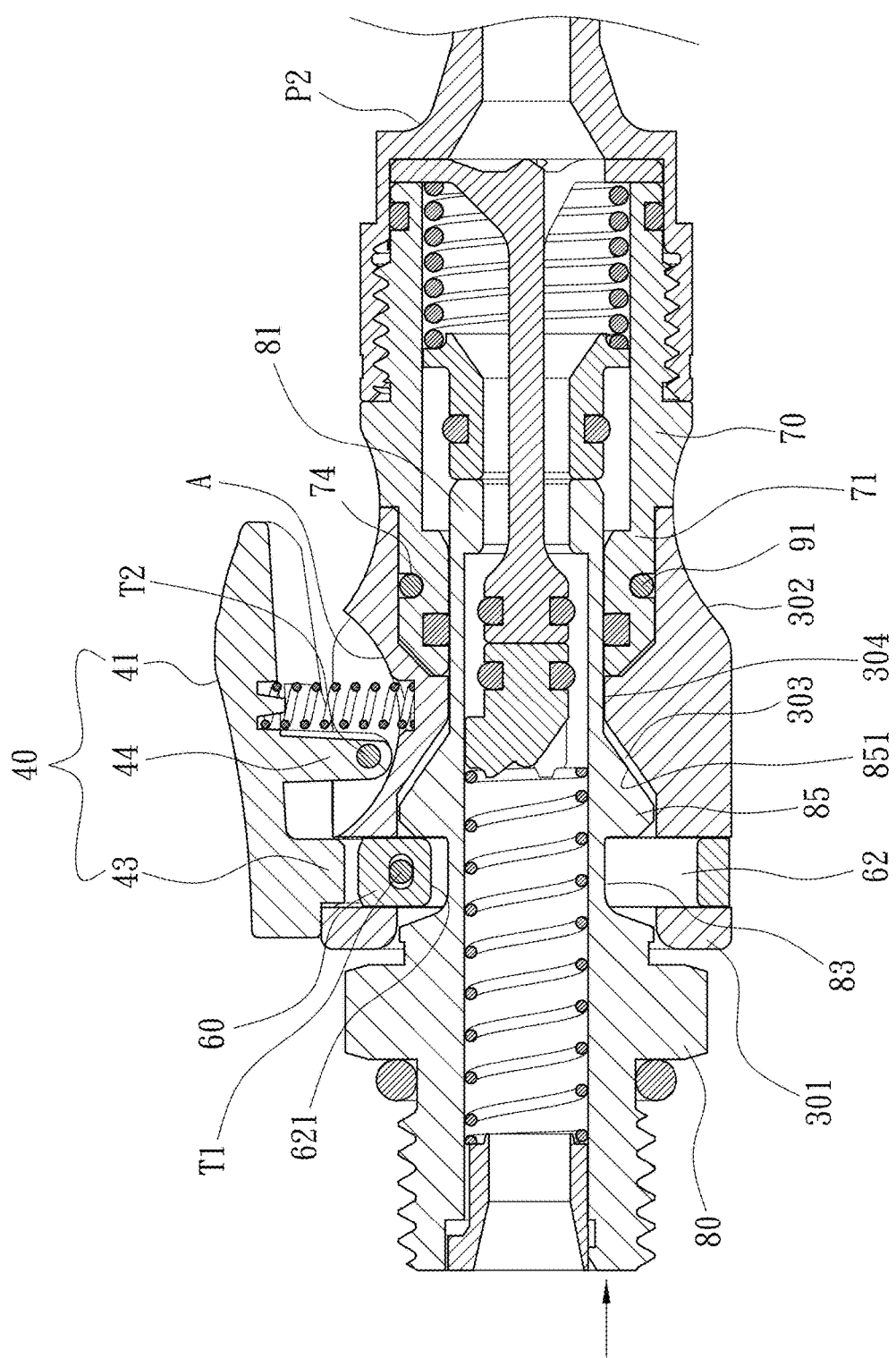
FIG. 5 is an assembled sectional side view showing the push type locking structure for pipe couplers according to the present invention is in a locked position to lock a second pipe to a first pipe.
Figure 6:
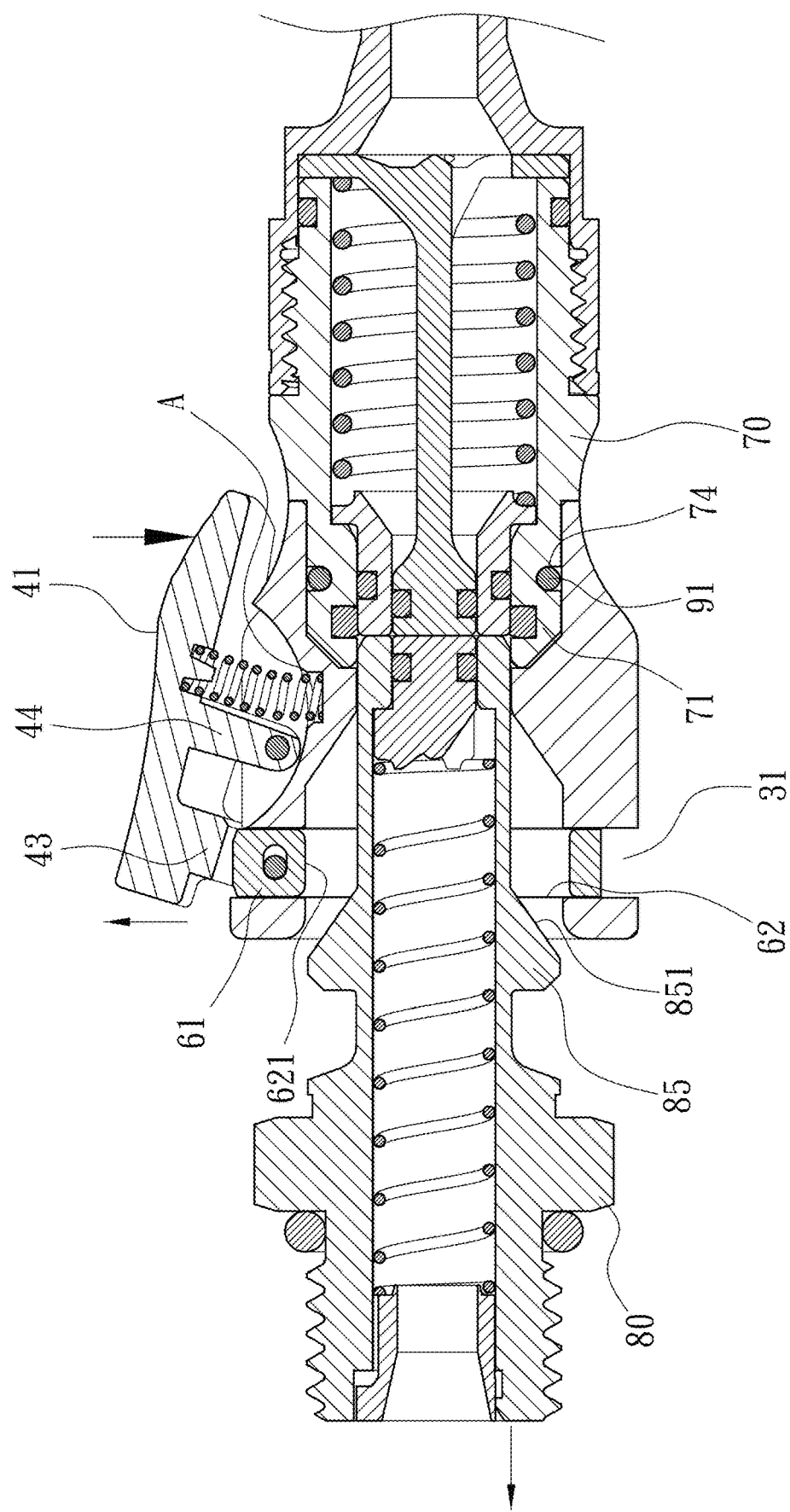
FIG. 6 is an assembled sectional side view showing the push type locking structure for pipe couplers according to the present invention is in an unlocked position to allow disconnecting of the second pipe from the first pipe.

Please refer to FIG. 5. A radially inward protruded annular wall portion 304 is formed on an inner wall surface of the coupling pipe 30 close to the second end 302, and the annular wall portion 304 defines a central opening communicable with the passage 303.

The push member 40 includes a push side 41 located at a top of the push member 40, a bottom side 42, a pair of first pivotal connection sections 43, a second pivotal connection section 44, and a locating hole 45. The pair of first pivotal connection sections 43 is perpendicularly projected downward from a front end of the bottom side 42 and is correspondingly provided at respective lower end with a first pivotal hole 431, and an upward extended receiving space 432 is defined between the two first pivotal connection sections 43. The push retaining member 60 is pivotally connected to the push member 40 via the first pivotal holes 431. The second pivotal connection section 44 is perpendicularly projected downward from the bottom side 42 and located close to the first pivotal connection sections 43. The second pivotal connection section 44 is provided at a lower end with a second pivotal hole 441 for pivotally connecting with the pipe pivotal holes 34 on the recess 33. The locating hole 45 is sunken from the bottom side 42 and located near the second pivotal connection section 44.

The second pivotal section 44 of the push member 40 has a lower end forming a curved bottom B for correspondingly contacting with the curved bottom A of the recess 33, so that the curved bottom B of the second pivotal connection section 44 would not interfere with the curved bottom A of the recess 33 when the second pivotal connection section 44 pivotally turns in the recess 33.

Further, the second pivotal connection section 44 of the push member 40 has a width smaller than a width between the two side walls 332 of the recess 33, such that the second pivotal connection section 44 can be set between the two side walls 332 of the recess 33 to be pivotally connected to the two pipe pivotal holes 34. With these arrangements, the second pivotal connection section 44 and the pipe pivotal holes 34 together forms a fulcrum, about which the push member 40 can stably pivotally turn relative to the recess 33 of the coupling pipe 30.

The spring 50 has two ends elastically pressed against the blind hole 35 on the recess 33 and the locating hole 45 on the push member 40. Thus, the spring 5 is located between the coupling pipe 30 and the push member 40 to provide the push member 40 with an upward elastic restoring force, enabling the push member 40 to elastically return from a downward pushed position to its original position.

The push retaining member 60 includes a top portion 61, an opening 62, and a retaining edge 621 attached to the opening 62. In the illustrated embodiment, the push retaining member 60 has configuration and size smaller than or equal to those of the receiving hole 31 to facilitate radial insertion of the push retaining member 60 into the receiving hole 31 to slide radially upward and downward in the receiving hole 31. The top portion 61 is protruded from a top of the push retaining member 60 and is provided with a retaining pivotal hole 611 corresponding to the pair of first pivotal holes 431 of the push member 40. The opening 62 has a diameter larger than or equal to an inner diameter of the inner wall of the passage 303 of the coupling pipe 30. The retaining edge 621 is formed by radially inward protruding from a part of an inner wall surface of the opening 62 toward a centerline of the opening 62. With these arrangements, the opening 62 and the retaining edge 621 can be moved into or out of the passage 303 when the push retaining member 60 is radially slid relative to the receiving hole 31.

Specifically, the top portion 61 of the push retaining member 60 has a width smaller than that of the receiving space 432 defined between the first pivotal connection sections 43. Therefore, the top portion 61 of the push retaining member 60 can be easily set in the receiving space 432 to pivotally connect to the first pivotal holes 431.

The at least two shafts include a first shaft T1 extending through the first pivotal holes 431 of the push member 40 and the retaining pivotal hole 611 of the push retaining member 60, and a second shaft T2 extending through the second pivotal hole 441 on the push member 40 and the pipe pivotal holes 34 on the coupling pipe 30, such that the push member 40 is pivotally connected to the push retaining member 60 and the coupling pipe 30 via the first pivotal holes 431 and the second pivotal hole 441, respectively.

The first pipe 70 is internally provided with a first valve core structure and the second pipe 80 is internally provided with a second valve core structure. Since the first and the second valve core structure are not the subject matters of the present invention, they are not described herein. Only the parts in the push type locking structure 100 that enable the first and the second pipe 70, 80 to lock to or unlock from each other are described herein.

The first pipe 70 includes an engaging section 71, a first connecting side 72, and a first flow passage 73 axially extending through the first pipe 70.

The engaging section 71 and the first connecting side 72 are located at two opposite ends of the first pipe 70. And, the engaging section 71 is provided on an outer circumferential wall surface with an annular groove 74.

The second pipe 80 includes a coupling section 81, a second connecting side 82, a locating groove 83, and a second flow passage 84 axially extending through the second pipe 80. The coupling section 81 and the second connecting side 82 are located at two opposite ends of the second pipe 80. The locating groove 83 is provided around an outer circumferential surface of the second pipe 80 near a middle portion thereof. The coupling section 81 is externally provided with a radially protruded wall portion 85, which is located adjacent to the locating groove 83 and has a beveled surface 851 facing away from the locating groove 83. The coupling section 81 of the second pipe 80 is movably inserted into the engaging section 71 of the first pipe 70.

FIG. 5 is an assembled sectional side view showing the push type locking structure for pipe couplers according to the present invention in a locked position. Please refer to FIG. 5 along with FIG. 4. When using the locking structure 100 of the present invention to lock the second pipe 80 to the first pipe 70, first insert the engaging section 71 of the first pipe 70 into the second end 303 of the coupling pipe 30 to press against the radially inward protruded annular wall portion 304. At this point, the first flow passage 73 in the first pipe 70 is communicable with the passage 303 in the coupling pipe 30. A rotating mechanism 9 is provided between the second end 302 of the coupling pipe 30 and the engaging section 71 of the first pipe 70 for limiting the first pipe 70 from axially separating from the coupling pipe 30, as will be described in more detail later. At this point, the spring 50 on the coupling pipe 30 is in an elastically extended state to upward push against the push member 40 for setting the same in a horizontal position, and the push retaining member 60 is brought by the first pivotal connection sections 43 to move radially into the receiving hole 31 while the retaining edge 621 in the opening 62 of the push retaining member 60 is protruded into the passage 303 of the coupling pipe 30. When the coupling end 81 of the second pipe 80 is correspondingly extended through the first end 301 of the coupling pipe 30 into the passage 303 and the retaining edge 621 of the push retaining member 60 slides over the beveled surface 851 of the radially protruded wall portion 85 on the second pipe 80 to set in the locating groove 83, the second pipe 80 is restricted by the push retaining member 60 from moving axially and the locking structure 100 is in a locked position. At this point, the coupling section 81 of the second pipe 80 and the engaging section 71 of the first pipe 70 are connected to each other to firmly hold and connect the second pipe 80 to the first pipe 70. Further, when the second pipe 80 is extended into the coupling pipe 30, the beveled surface 851 of the radially protruded wall portion 85 on the second pipe 80 correspondingly lifts the push retaining member 60, enabling the push retaining member 60 to engage with the coupling pipe 30 directly without the need of pushing the push member 40 downward by an operator.

Please refer to FIG. 6 that is an assembled sectional side view showing the push type locking structure for pipe couplers according to the present invention is in an unlocked position. To do so, simply push the push side 41 of the push member 40 downward. A this point, the spring 50 is downward compressed by the bottom side 42 of the push member 40, and the push member 40 is pivotally turned about the second pivotal hole 441 on the second pivotal connection section 44 and the pipe pivotal holes 34 on the recess 33 of the coupling pipe 30. Meanwhile, the curved bottom B at the lower end of the second pivotal connection section 44 cooperates with the curved bottom A of the recess 33, so that the second pivotal connection section 44 in rotating pivotally does not interfere with the recess 33. When the first pivotal connection sections 43 are lifted, they bring the push retaining member 60 to move radially upward relative to the receiving hole 31, such that the retaining edge 621 in the opening 62 is moved away from the locating groove 83 to a position higher than the radially protruded wall portion 85. At this point, the push retaining member 60 no longer limits the second pipe 80 from moving axially and the locking structure 100 is in an unlocked position, allowing the coupling section 81 of the second pipe 80 to be moved axially outward via the opening 62, so that the second pipe 80 is disconnected from the first pipe 70.

When the second pipe 80 is to be inserted into the coupling pipe 30 again, simply align the coupling section 81 of the second pipe 80 with the first end 301 of the coupling pipe 30 and apply an axial force to push the coupling section 81 into the passage 303, until the retaining edge 621 is moved into and retained to the locating groove 83. At this point, the locking structure 100 is in the locked position, and the second pipe 80 can be inserted into the coupling pipe 30 to firmly connect to the first pipe 70 without the need of pushing the push member 40. On the other hand, when it is desired to unlock the second pipe 80, simply push the push member 40 downward and the second pipe 80 can be unlocked and disconnected from the coupling pipe 30 and the first pipe 70. With the above arrangements, the locking structure 100 provides enhanced connection reliability and can be operated easily and smoothly.

Please refer to FIGS. 4 and 5 again. With respect to the rotating mechanism 9 provided between the second end 302 of the coupling pipe 30 and the engaging section 71 of the first pipe 70, it includes a pair of pin holes 90, which are formed on a wall of the coupling pipe 30 at the second end 302 to perpendicularly penetrate the wall in a radial direction, and a stop pin 91 connected to between the two pin holes 90. In the illustrated embodiment, there are shown two pairs of pin holes 90 located at a higher and a lower position to penetrate the wall of the coupling pipe 30, so that a stop pin 90 can be extended through each pair of the pin holes 90 from an outer side of the coupling pipe 30 to be fixed to the wall at the second end 302 and engage with the annular groove 74 provided on the outer wall surface of the engaging section 71 of the first pipe 70. In other words, when the second end 302 of the coupling pipe 30 is fitted on around the engaging section 71 of the first pipe 70, portions of the two stop pins 91 that are located inside the coupling pipe 30 would engage with the annular groove 74 to thereby provide the functions of preventing the second end 302 of the coupling pipe 30 from axially separating from the engaging section 71 of the first pipe 70 and allowing the second end 302 of the coupling pipe 30 connected to the engaging section 71 of the first pipe 70 to rotate relative to the engaging section 71 about an axis of the first pipe 70 for the purpose of positional adjustment to avoid misalignment of the coupling pipe 30 with the first pipe 70 and keep the push member 40 assembled to the coupling pipe 30 always located at an upper side of the coupling pipe 30 to ensure convenient and correct operation of the push member 40. Further, a first pipe connecting head P2 can be connected end-to-end to the first connecting side 72 of the first pipe 70, and a second pipe connecting head (not shown) can be connected end-to-end to the second connecting end 82 of the second pipe 80. In this manner, it is also able to solve the problem that the first pipe connecting head P2 connected to the first pipe 70 and the second pipe connecting head (not shown) connected to the second pipe 80 are not symmetrical to each other.

The present invention eliminates the problem in the prior art that, when the inverted-L shaped locking member 25 is downward pushed, it is in frictional contact with the inner wall surface of the mounting hole 211 to result in serious interference with each other and cause wear of the locking member 25 and the mounting hole 211. The locking member 25 could not be smoothly operated to achieve successful unlocking or locking, and the male and female couplers 10, 20 could not be fully connected to cause leakage.

On the other hand, in the present invention, the push member 40 is pivotally connected to the coupling pipe 30 to pivot about the second pivotal connection section 44 and the recess 33, and to the push retaining member 60 to pivot about the first pivotal connection sections 43, and the push retaining member 60 is radially extended into the receiving hole 31 on the coupling pipe 30, such that the second pipe 80 can be axially extended through the opening 62 of the push retaining member 60. These arrangements have the following advantages:

(1) With the pivotal connection, the push member can operate evenly and stably through leverage and move radially smoothly to avoid assembly tolerance.

(2) It is able to avoid excessive friction and resultant wear between the push retaining member and the receiving hole.

(3) The use of the coupling pipe to serve as an intermediate member between the first and the second pipe can avoid the need of changing the original structures of the two ends of the first and second pipes to be connected correspondingly, so as to enable enhanced reliability and reduced cost of the pipe connection.

(4) The push type locking structure for pipe couplers prevents the first and the second pipe from rotating relative to each other, so as to avoid the problem of having asymmetric first and second pipe connecting heads connected to the first and the second pipe, respectively.

(5) The locking structure of the present invention allows the first and the second pipe to translate radially without altering the central path or flow passage defined in the two pipes.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A push type locking structure for pipe couplers, comprising:
   a coupling pipe having a first end and a second end and internally defining a passage; and the coupling pipe being provided on an outer surface at a position between the first and the second end with a recess having a pair of pipe pivotal holes located perpendicular to the recess, and on the outer surface at a position closer to the first end with a receiving hole that extends radially through the outer wall of the coupling pipe and communicates with the passage;

a push member having a pair of first pivotal connection sections and a second pivotal connection section provided on a bottom side thereof; and the first pivotal connection sections respectively having a first pivotal hole provided thereon and the second pivotal connection section having a second pivotal hole provided thereon;

a push retaining member defining an opening, and having a retaining pivotal hole provided at a top portion thereof;

at least two shafts, one of which is extended through the first pivotal holes and the retaining pivotal hole and the other of which is extended through the second pivotal hole and the pipe pivotal holes, such that the push member is pivotally connected to the push retaining member and to the coupling pipe; and a spring located in the recess with two ends elastically pressed against the bottom of the recess and the bottom side of the push member; and wherein when the push member is pushed downward, the spring is elastically compressed and the push retaining member is lifted upward radially at the same time, such that the push retaining member no longer limits a pipe connected to the coupling pipe from moving axially and the pipe is unlocked from the coupling pipe.

2. The push type locking structure for pipe couplers as claimed in claim 1, wherein the coupling pipe has a second pipe and a first pipe connected to the first end and the second end thereof, respectively; the first pipe including an engaging section inserted into the second end of the coupling pipe, and the second pipe including a coupling section inserted into the first end of the coupling pipe to connect to the engaging section of the first pipe; the second pipe being provided at a middle section with a locating groove extending around the second pipe, and the push retaining member being engaged with the locating groove to limit the second pipe from moving axially relative to the coupling pipe.

3. The push type locking structure for pipe couplers as claimed in claim 2, wherein an end of the first pipe located opposite to the engaging section is connectable to a first pipe connecting head, and an end of the second pipe located opposite to the coupling section is connectable to a second pipe connecting head.

4. The push type locking structure for pipe couplers as claimed in claim 2, wherein the coupling pipe includes a rotating mechanism located between the second end and the engaging section of the first pipe.

5. The push type locking structure for pipe couplers as claimed in claim 4, wherein the rotating mechanism includes at least one pair of pin holes formed on a wall of the coupling pipe at the second end to perpendicularly penetrate the wall in a radial direction, and a stop pin for connecting to between each pair of the pin holes; the stop pins being respectively extended into one pair of pin holes to be fixedly held to an inner wall surface of the second end of the coupling pipe, and the stop pins being adapted to engage with an annular groove formed on an outer wall surface around the engaging section of the first pipe.

6. The push type locking structure for pipe couplers as claimed in claim 1, wherein the coupling pipe has a blind hole provided on the bottom of the recess, and the push member being provided on the bottom side with a locating hole corresponding to the blind hole; and the two ends of the spring being elastically pressed against the blind hole and the locating hole.

7. The push type locking structure for pipe couplers as claimed in claim 6, wherein the recess on the coupling pipe consists of a front section, a middle section, and a rear section; the middle section being connected to between the front and the rear section and having a recess depth larger than those of the front and the rear section; and the front and the rear section having an opening facing toward the second pipe and the first pipe, respectively.

8. The push type locking structure for pipe couplers as claimed in claim 7, wherein the front, the middle, and the rear section of the recess together define a curved bottom for the recess, and the second pivotal connection section of the push member having a lower end forming another curved bottom corresponding to the curved bottom of the recess.

9. The push type locking structure for pipe couplers as claimed in claim 7, wherein the second pivotal connection section of the push member has a width smaller than a width between two side walls of the recess, and the pair of pipe pivotal holes being perpendicularly extending through the two side walls of the recess.

\* \* \* \* \*